(12) United States Patent
Wolf et al.

(10) Patent No.: US 7,796,250 B2
(45) Date of Patent: Sep. 14, 2010

(54) ELECTRO-OPTICAL MEASURING DEVICE

(75) Inventors: Peter Wolf, Leinfelden-Echterdingen (DE); Uwe Skultety-Betz, Leinfelden-Echterdingen (DE); Joerg Stierle, Waldenbuch (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 11/917,049

(22) PCT Filed: Jul. 25, 2006

(86) PCT No.: PCT/EP2006/064614

§ 371 (c)(1),
(2), (4) Date: Dec. 10, 2007

(87) PCT Pub. No.: WO2007/028667

PCT Pub. Date: Mar. 15, 2007

(65) Prior Publication Data

US 2008/0192256 A1  Aug. 14, 2008

(30) Foreign Application Priority Data

Sep. 5, 2005 (DE) .................... 10 2005 041 980

(51) Int. Cl.
*G01J 3/30* (2006.01)
(52) U.S. Cl. ..................................... 356/300

(58) Field of Classification Search ................. None
See application file for complete search history.

(56) References Cited

U.S. PATENT DOCUMENTS

| 6,046,795 | A | 4/2000 | Sugiyama et al. |
| 7,142,288 | B2 * | 11/2006 | Stierle et al. ............... 356/4.01 |
| 2003/0123868 | A1 | 7/2003 | Nakano et al. |
| 2004/0070747 | A1 * | 4/2004 | Schmidt et al. ............. 356/5.1 |
| 2005/0162639 | A1 | 7/2005 | Stierle |

FOREIGN PATENT DOCUMENTS

| DE | 199 02 523 | 7/1999 |
| DE | 198 04 050 | 8/1999 |
| DE | 201 20 593 | 4/2002 |
| DE | 101 57 378 | 6/2003 |
| DE | 103 08 085 | 10/2003 |
| DE | 102 35 562 | 2/2004 |
| EP | 1 006 368 | 6/2000 |
| GB | 2 334 172 | 8/1999 |
| WO | 03/046604 | 6/2003 |

* cited by examiner

*Primary Examiner*—Tu T Nguyen
(74) *Attorney, Agent, or Firm*—Michael J. Striker

(57) ABSTRACT

An electro-optical measuring device, in particular a handheld device for contactless distance measurement, has an optical transmission path that includes at least one optical transmitter for transmitting a measurement signal, a reception path with at least one receiving optics for bundling a measurement signal in the direction of a receiver, and an optics carrier, which accommodates components of the transmission and reception path and the is made of plastic.

12 Claims, 3 Drawing Sheets

ELECTRO-OPTICAL MEASURING DEVICE

CROSS-REFERENCE TO A RELATED APPLICATION

The invention described and claimed hereinbelow is also described in German Patent Application DE 10 2005 041 980.1 filed on Sep. 5, 2005. This German Patent Application, whose subject matter is incorporated here by reference, provides the basis for a claim of priority of invention under 35 U.S.C. 119(a)-(d).

BACKGROUND OF THE INVENTION

Electro-optical measuring devices that include an optical transmission path with at least one optical transmitter and an optical reception path with at least one receiving lens system require a high degree of mechanical and thermal stability to ensure that the optical axes of, e.g., the transmission and reception paths, extend toward each other after a single adjustment.

Publication DE 19804050 A1 makes known a device for optical distance measurement, with which the transmission device, the receiving lens system, and a converter for the measurement signal form a single assembly, which is integrated in a housing of the distance measuring device. The assembly includes a carrying body made of zinc die-cast material. The carrier body of the measuring device described in DE 19804050 A1 is designed primarily in the shape of a plate and includes—on a side facing the object to be measured—a frame that is supported on the frame body via two lateral ribs. The outlet channel of the optical device of this distance measuring device is fixedly mounted on the carrier body. To this end, tabs are formed on the outlet channel, via which the outlet channel may be screwed together with the carrier body using screws. The outlet channel, which is made of plastic, forms a receptacle on its outer wall for an electro-optical converter.

Publication DE 10157378 A1 makes known a measuring device for contactless distance measurement that includes an optical transmission path with an optical transmitter and an optical reception path with a receiving lens system and an optical receiver, and a device module that accommodates these components of the transmission and reception module. To retain a high level of measuring accuracy across the entire temperature range, the components of the transmission and reception path are placed such that, if the device module curves—due to the influence of temperature—in the direction of the optical axes of the transmission and reception path, the optical axes are deflected in the same direction by the same amount.

SUMMARY OF THE INVENTION

The inventive electro-optical measuring device includes an optical transmission path with at least one optical transmitter for transmitting a measurement signal, and a reception path with at least one receiving lens system for bundling a measurement signal in the direction of a receiver. The electro-optical measuring device also includes a lens system-carrier body, on which components of the transmission and reception path are installed. The lens system-carrier body of the inventive electro-optical measuring device is advantageously made of plastic.

By making the lens system-carrier body of plastic, it is possible to manufacture a carrier body of this type with narrow tolerances, thereby eliminating the need to perform material-removing reworking of, e.g., pressure diecast parts, which is often necessary with metal lens system carriers. In addition, pressure diecast parts—as are used in devices according to the related art—have a more or less metallic-shiny surface, which usually requires that a second plastic funnel be used to prevent secondary reflections, e.g., between a receiving lens and the actual receiver.

The lens system-carrier body made of plastic may be easily dyed in a desired color, to proactively prevent reflections of this type.

Advantageously, the lens system-carrier body also acts as an electrically insulating element, thereby reliably ensuring that short-circuits are prevented, e.g., when installing and securing a printed circuit board on which electronic components of the measuring device are mounted. In the inventive electro-optical measuring device, this makes it possible to greatly reduce the safety margins, e.g., between the lens system-carrier body and a printed circuit board equipped with the essential electronic components of the device. Due to the electrical conductivity of metallic ticker carriers, which are widespread in devices in the related art, it was necessary to provide greater safety margins or insulation means when installing a printed circuit board of this type on lens system carriers, to reliably prevent short circuits.

Making an lens system-carrier body of this type out of plastic—according to the present invention—also makes it possible to easily design, e.g., latch hooks directly on the lens system-carrier body, thereby making it possible to integrate other components in and on the lens system-carrier body in a simple, cost-favorable, and easily assembled manner.

Advantageously, the lens system-carrier body of the inventive measuring device is designed as a single piece. An electro-optical measuring device of this type may include, e.g., an lens system-carrier body that is formed directly using plastic injection-molding technology. Fastening means for optical and electronic components may be formed directly at the same time.

It is possible, in particular, to form a reinforcing structure, e.g., a honeycomb structure, as a single piece with the lens system-carrier body, in order to provide it with the necessary stiffness.

It is advantageous to form the reinforcing structure on a side of the lens system-carrier body facing away from the printed circuit board to be connected with the lens system-carrier body. In this manner, the reinforcing structure on a flat side of the lens system-carrier body provides greater stability, while the printed circuit board—which is connected with the lens system carrier, e.g., via being screwed in place—on the opposite flat side increases the stability of the plastic component.

In an advantageous embodiment of the inventive measuring device, a tube, which is located, e.g., between a receiving lens of the measuring device and a receiver of the measuring device, is formed as one piece with the lens system-carrier body. Advantageously, a tube of this type may be formed directly in the lens system-carrier body material.

It is also advantageously possible to form a receptacle for the receiving lens, and/or a receptacle for an optical filter element, and/or a receptacle for a display as one piece with the lens system-carrier body. Receptacles of this type include support or contact points for the electro-optical components of the measuring device to be connected with the lens system-carrier body. It is advantageously possible, for example, to form an exact guide for a printed circuit board with electronic components, e.g., including an electro-optical receiver, directly in the lens system-carrier body, so that this printed circuit board and the electro-optical receiver connected therewith may be adjusted exactly, e.g., in the focal point of a receiving lens.

The inventive plastic lens system-carrier body advantageously makes it possible to realize a compact and economical measuring device, e.g., an electro-optical rangefinder.

Further advantages of the inventive measuring device result from the description, below, of an exemplary embodiment of a device of this type.

An exemplary embodiment of an inventive measuring device is depicted in the drawing, and it is described in greater detail in the subsequent description. The figures in the drawing, their descriptions, and the claims contain numerous features in combination. One skilled in the art will also consider the features individually and combine them to form further reasonable combinations.

DESCRIPTION OF THE PREFERRED EMBODIMENTS

Figure 1:
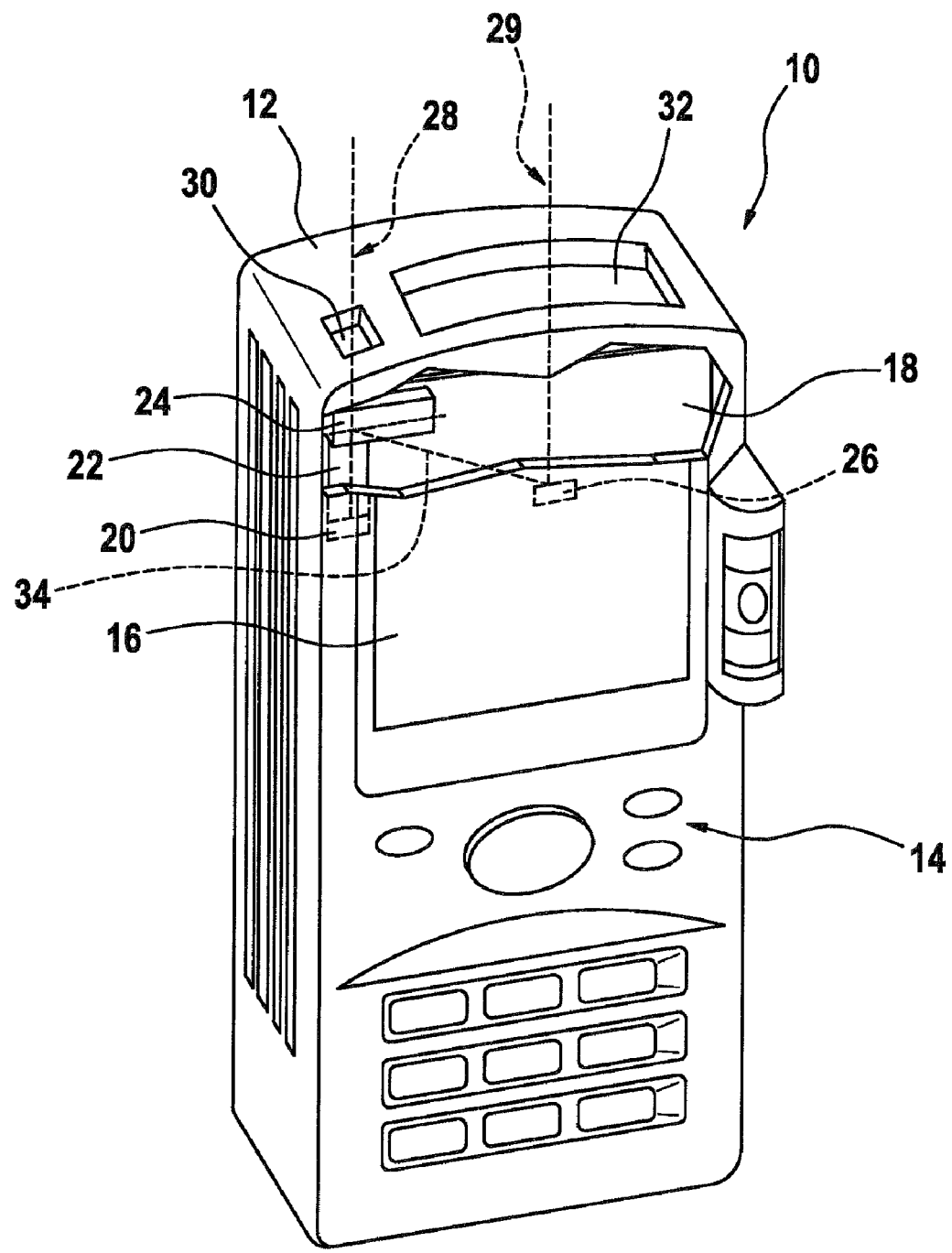
FIG. 1 shows an electro-optical distance-measuring device with a transmitting unit and a reception unit in a perspective overview depiction.

FIG. 1 shows a distance-measuring device 10, which is designed as an electro-optical measuring device. It includes a housing 12, actuating elements 14 for switching distance-measuring device 10 on and off, and for starting and configuring a measuring procedure. In addition to actuating elements 14, the measuring device also includes a display 16 for depicting measurement results and displaying the device status. A transmitting unit 20 designed as a laser diode for generating an optical transmission measurement signal, and electronic components of an evaluation unit are located on an electronic carrier element, e.g., a printed circuit board 18, inside housing 12 of measuring device 10. Electronic carrier element 18 is attached to a plastics lens system carrier using fastening means, e.g., screws. The plastic lens system carrier includes—in a manner to be described—a light channel 22, a deflecting unit 24 for deflecting the transmitted measurement signal, and receiving lens system for bundling measurement signal components toward a reception unit 26. Transmitting unit 20, light channel 22, deflecting unit 24, and a reference path 34 of a reference signal are shown schematically in FIG. 1.

To measure a distance from distance-measuring device 10 to a remote object, transmitting unit 20 sends out a transmitted measurement signal along a sending path 28 during operation. The transmitted measurement wavelength leaves the measuring device via a window 30 in housing 12 of the device. The measurement signal, which is reflected and/or scattered by a surface of a remote object to be measured, is partially coupled into the housing again via a window 32, and it is detected—using a receiving lens system that is not shown in FIG. 1—as a received measurement signal by a reception unit 26, e.g., a photodiode, in particular an APD. In alternative embodiments, the inlet window may be designed as one piece in the measuring device and the receiving lens system.

Using a phase comparison of the modulated measurement signal carried out between the transmitted measurement signal and the received measurement signal, the light transit time between the transmitter and the receiver of the device may be deduced. Using the known value for the speed of light, the distance between the measuring device and the object to be measured may be determined, as desired.

A reference measurement may be carried out before a distance measurement is performed, in order to take transit times into account that are independent of the distance from the measuring device and that result, e.g., when the transmitted measurement signal is generated and/or when the received measurement signal is processed in the device. The transmitted measurement signal is deflected by deflecting unit 24, and it is directed via a known reference path along path 34 directly to reception unit 26.

Figure 2:
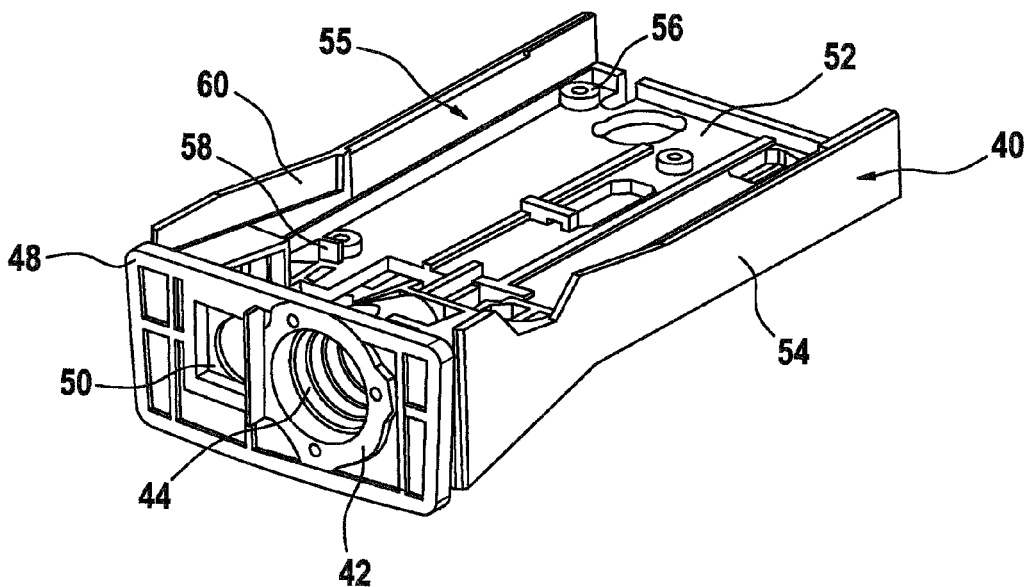
FIG. 2 shows an exemplary embodiment of the inventive lens system carrier, in a perspective top view.
Figure 3:
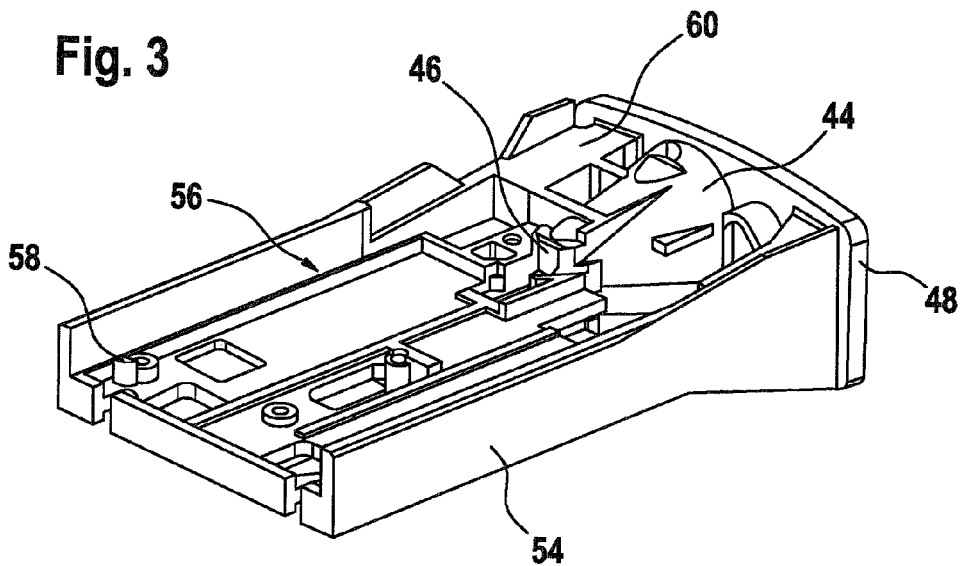
FIG. 3 shows the lens system carrier in FIG. 2, as viewed from the opposite direction.

FIG. 2 shows a perspective view of an exemplary embodiment of an inventive lens system carrier of a measuring device in a view opposite to the measuring direction of the measuring device. FIG. 3 shows a perspective view approximately in the direction of the measurement signal. Lens system carrier 40 is made as a single piece of plastic, e.g., PPS GF40 or fiberglass-reinforced PBT (at least approx. 30%), highly-reinforced PA6, e.g., Grivory or PEEK. Advantageously, a lens system carrier of this type may be formed directly using plastic injection-molding technology.

The lens system carrier includes a number of receptacles and fastening means for optical and/or electronic components of the measuring device. For example, plastic lens system carrier 40 includes—in its front region 48—a receptacle 42 for the receiving lens system that bundles the returning received measurement signal toward a receiver. A tube 44 is designed as one piece with lens system carrier 40. Tube 44 keeps the received measurement signal separated from the interior of the housing of the measuring device. A receptacle 46 for an optical filter is provided at the end of tube 44, which allows optical measurement frequencies to be transmitted, for example, but blocks ambient light and scattered light.

Advantageously, the plastic material of the lens system carrier may be selected such that its thermal expansion is compensated for by a corresponding change in the thermal refractive index of the receiving lens system. It is also advantageous in this case to use plastic to manufacture the receiving lens system.

Inventive lens system carrier 40 also includes—in its front region 48—a receptacle 50 for an outlet window of the transmitted measurement beam.

The lens system carrier, which is essentially plate-shaped, includes reinforcing ribs 54 on its two diametrically opposed longitudinal sides. Reinforcing ribs 54 extend past plate plane 52 in the vertical direction. Guide elements 56 for adjusting and securing an electronic carrier element 18, in particular a printed circuit board, are provided between reinforcing ribs 54. The material and, therefore, the expansion coefficient, of the lens system carrier may be chosen such that the thermal expansion essentially corresponds to the expansion of the printed circuit board, so that the lens system carrier does not become twisted at all due to different expansions of components that are fixed to each other. Front region 48 of the lens system carrier is also formed as a reinforcing frame, to provide the plastic body with the necessary torsional stiffness.

The receiver diode, which serves as the reception unit, is mounted on the printed circuit board, along with electronic components for control and the evaluation unit of the inventive measuring device. This pre-installed assembly on the electronic carrier element is slid into lens system carrier 40. Since the electronic components, including the receiver diode, are already fixed in position on the electronic carrier element, this assembly step is particularly easy to carry out. By axially orienting electronic carrier element 18 relative to optical carrier 40, it is only necessary to also adjust the distance between the receiving lens system and the receiver photodiode such that the photodiode that serves as the receiver is placed approximately in the focal point of the receiving lens system. Stop elements 58 are formed on reinforcing ribs 54, which make it possible to slide electronic carrier 18—including the pre-installed receiver photodiode—along the transmission path.

In addition to accommodating and guiding the electronic carrier element, the inventive plastic lens system carrier also includes a receptacle 60 for display 16 of the measuring device. It is possible, in particular, to apply a second plastic component—as a soft element—to the plastic lens system carrier via injection molding in the region of display receptacle 60, directly during the manufacturing process, in order to ensure that the optical display is supported in a soft manner.

Figure 4:
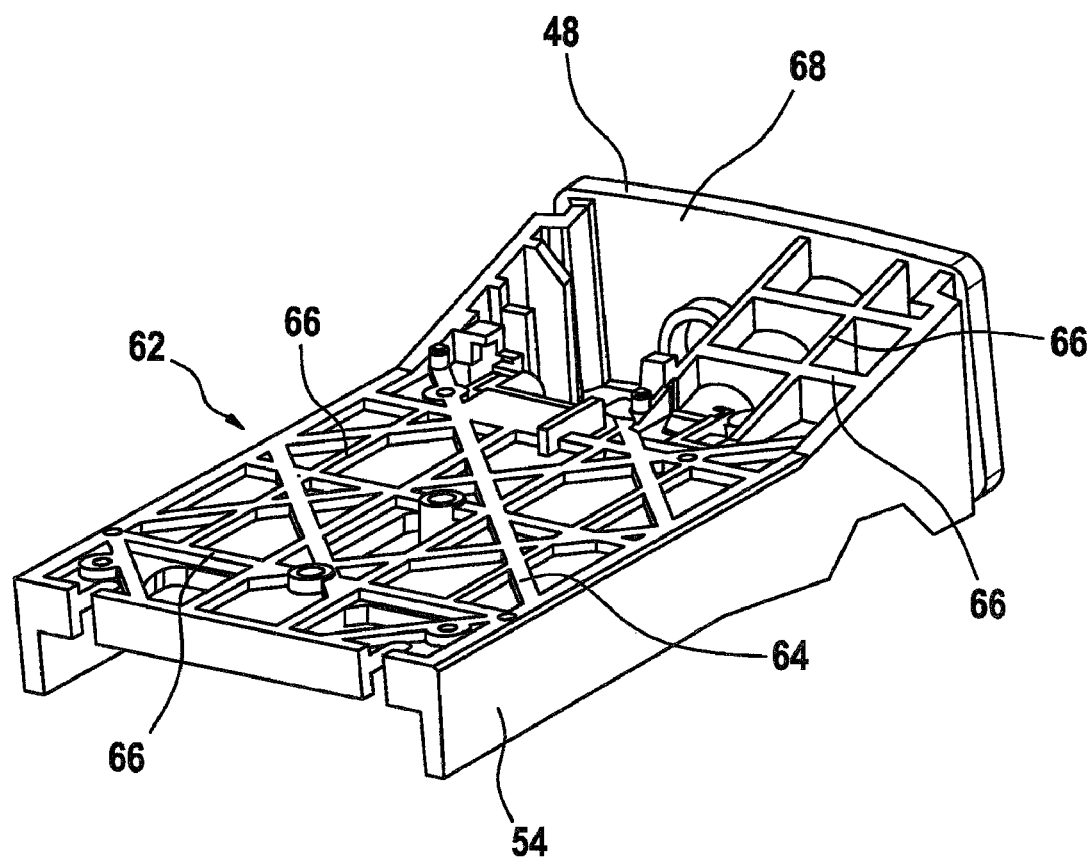
FIG. 4 shows the underside view of an inventive lens system carrier, which corresponds to FIG. 3.

To ensure that the plastic lens system carrier is provided with the necessary stability, it includes—in addition to reinforcing ribs 54—a reinforcing structure 62 on the side of plate plane 52 facing away from guide elements 56 for the electronic carrier. This is shown in FIG. 4, as an example. Reinforcing structure 62 is advantageously honeycombed in design, with transverse reinforcing ribs 64 that extend diagonally to reinforcing ribs 54. To ensure that the plastic injection-molded part has the stability it requires, a double-diagonal structure with additional transverse and longitudinal braces 66 was used in the inventive lens system carrier. The lens system carrier is therefore stabilized on its one flat side via reinforcing structure 62. On the opposite flat side of lens system carrier 40, flat electronics carrier 18 provides additional stabilization, so that the inventive lens system carrier has high stability and torsional stiffness despite the fact that it is made of a plastic material. Front region 48, which is designed as a frame or a front plate 68, also enhances the stiffness of plastic lens system carrier 40.

Advantageously, the plastic lens system carrier is also dyed, which results in a suppression of secondary reflections between the receiving lens system and the receiver photodiode. To this end, the plastic material may be dyed in its raw state, i.e., before the lens system carrier is formed. In this manner, it is possible—with the inventive plastic lens system carrier—to avoid having to subsequently apply dark, matt paint, which is necessary with metallic pressure diecast parts.

With the inventive measuring device, it is advantageously possible to eliminate an electronic shield of the electrical components and, in particular, the receiver diodes. This makes it possible to form the lens system carrier out of a plastic material. A metal cage for electromagnetically shielding electronic components is not required. With the inventive design, the specific placement of the electronic components, an incremental modulation of the receiver diode—as described in publication DE 102 35 562 A1—makes it possible to eliminate an electromagnetic shield of the electronic components. With the inventive plastic lens system carrier, it is possible to use a local shielding element, e.g., a small, automatically installable shield plate, if this should become necessary due to the special requirements of the measurement device.

The inventive plastic lens system carrier makes it possible to realize a compact—and hand-held, in particular—measuring device, e.g., a laser rangefinder, and it represents a clear advance compared with the known devices of the related art, particularly in terms of the manufacturing costs, and the size and weight of the device. In particular, the inventive plastic lens system carrier with a pre-installed electronics carrier may be slid into the housing of a measuring device, so that the inventive measuring device may be produced using simple method steps that may be performed by a machine.

The inventive measuring device is not limited to the exemplary embodiment depicted in the description.

What is claimed is:

1. An electro-optical measuring device, in particular a hand-held device (10) for contactless distance measurement, with an optical transmission path (28) that includes at least one optical transmitter (20) for transmitting a measurement signal, and with a reception path (29) with at least one receiving optics for bundling a measurement signal in the direction of a receiver (26), and with an optics carrier (40), which accommodates components of the transmission and reception path, wherein the optics carrier (40) is made of plastic for providing temperature stability for maintaining high measuring accuracy of the electro-optical measuring device.

2. The measuring device as recited in claim 1, wherein the optics carrier (40) is designed as one piece.

3. The measuring device as recited in claim 1, wherein a reinforcing structure (62) is designed as one piece with the optics carrier (40).

4. The measuring device as recited in claim 3, wherein the guide element (56) and a receptacle (58) for the electrical printed circuit board (18) are formed on a side of the optics carrier (40) facing away from the reinforcing structure (62).

5. The measuring device as recited in claim 1, wherein at least one guide element (56) for at least one electrical printed circuit board (18) is designed as a single piece with the optics carrier (40).

6. The measuring device as recited in claim 1, wherein a tube (44) located between the receiving optics and the receiver (26) is designed as one piece with the optics carrier (40).

7. The measuring device as recited in claim 1, wherein a receptacle (42) for the receiving optics is designed as one piece with the optics carrier (40).

8. The measuring device as recited claims 1, wherein a receptacle (46) for a filter element is designed as one piece with the optics carrier (40).

9. The measuring device as recited in claim 1, wherein a receptacle (60) for a display (16) is designed as one piece with the optics carrier (40).

10. The measuring device as recited in one claim 1, wherein the measuring device is a laser rangefinder (10).

11. A method for manufacturing an electro-optical measuring device, in particular a hand-held device (10) for contactless distance measurement, as recited in claim 1, wherein the optics carrier body (40) of the device is formed of plastic using plastic injection-molding technology for providing temperature stability for maintaining high measuring accuracy of the electro-optical measuring device.

12. The method as recited in claim 11, wherein at least one electronics carrier element (18), in particular an electrical printed circuit board, is connected with the optics carrier body (40), then both are installed together in a housing (12) of the measuring device.

\* \* \* \* \*